(12) United States Patent
Chen

(10) Patent No.: US 8,393,231 B2
(45) Date of Patent: Mar. 12, 2013

(54) MULTIFUNCTIONAL TORQUE TOOL DETECTION DEVICE

(75) Inventor: Chiang Kao Chen, Taipei Hsien (TW)

(73) Assignee: Legend Lifestyle Products Corp., Taipei (TW)

( * ) Notice: Subject to any disclaimer, the term of this patent is extended or adjusted under 35 U.S.C. 154(b) by 304 days.

(21) Appl. No.: 12/946,003

(22) Filed: Nov. 15, 2010

(65) Prior Publication Data

US 2012/0118078 A1 May 17, 2012

(51) Int. Cl.
B25B 23/14 (2006.01)
(52) U.S. Cl. .................. 73/862.21; 73/862.22
(58) Field of Classification Search ........... 73/862.21, 73/862.22
See application file for complete search history.

(56) References Cited

U.S. PATENT DOCUMENTS

| | | | | |
|---|---|---|---|---|
| 4,281,538 A * | 8/1981 | Dudek | ....... | 73/862.21 |
| 4,485,681 A * | 12/1984 | Hatamura | ....... | 73/862.041 |
| 4,792,756 A * | 12/1988 | Lam et al. | ....... | 324/232 |
| 4,976,160 A * | 12/1990 | Dobler et al. | ....... | 73/862.336 |
| 5,027,280 A * | 6/1991 | Ando et al. | ....... | 700/174 |
| 5,115,701 A * | 5/1992 | Lehnert | ....... | 81/467 |
| 5,351,039 A * | 9/1994 | Oketani et al. | ....... | 340/680 |
| 5,567,886 A * | 10/1996 | Kettner | ....... | 73/862.23 |
| 5,703,484 A * | 12/1997 | Bieberdorf et al. | ....... | 324/207.22 |
| 7,591,195 B2 * | 9/2009 | Puzio | ....... | 73/862.324 |
| 7,900,715 B2 * | 3/2011 | Chen | ....... | 173/183 |
| 2010/0107824 A1 * | 5/2010 | Hanspers et al. | ....... | 81/57.11 |

* cited by examiner

Primary Examiner — Max Noori
(74) Attorney, Agent, or Firm — Rosenberg, Klein & Lee

(57) ABSTRACT

A multifunctional torque tool detection device includes at least one connection body, at least one tool joint bar, at least one signal ring assembly, a toque detection device, an angle sensor, a plurality of signal pick-up elements, and a displaying and processing unit. The connection body has an end coupled to the tool joint bar, and the tool joint bar is connected to at least one tool bit. The connection body is encased in a tool casing. The signal ring assembly is coupled between the connection body and the tool joint bar. The toque detection device and the angle sensor are attached to the connection body so that the toque detection device and the angle sensor respectively detect a torque value and an angle value applied by the tool bit in a clockwise or counterclockwise rotation operation, and generate a torque detection signal and an angle detection signal that are supplied through the signal ring assembly. The signal pick-up elements are set in contact with the signal ring assembly to pick up the torque detection signal and the angle detection signal during the rotation of the connection body. The displaying and processing unit is connected to the signal pick-up elements to receive the torque detection signal and the angle detection signal and display an actual torque and angle that the tool bit applies in an operation thereof.

34 Claims, 14 Drawing Sheets

MULTIFUNCTIONAL TORQUE TOOL DETECTION DEVICE

BACKGROUND OF THE INVENTION

1. Field of the Invention

The present invention relates to a multifunctional torque tool detection device, and in particular to a device that finds applications in the operation of hand tools for simultaneous detection and displaying of torques applied in clockwise and counterclockwise directions and a horizontal angle of the hand tools.

2. The Related Arts

A hand tool, such as a screwdriver, a wrench socket or a spanner, is widely used in assembling and maintenance operations of mechanical engineering for tightening or loosening threaded fasteners or threaded components, such as nuts and bolts. However, for high precision mechanical parts, the nuts or bolts must be tightened or loosened by following predetermined operation processes with preset levels of torques. Improper operation may inadvertently damage or break threads of nuts or bolts or even cause undesired damage to the functionality and operation precision of the tools themselves.

The conventional hand tools are not capable of detecting and displaying the value of an applied torque and so that they cannot allow a user of the tool to realize the actual level of the torque applied. Consequently, a user of these tools must depend on his or her experience and discretion to operate the tool and this may lead to improper operation. If the problem is solved by providing each tool with a specific torque detector to form individual torque detectable tools, then the costs for the design and manufacture must be greatly increased. Further, this arrangement may not be feasible for all applications where hand tools are used to apply a torque to a workpiece, so that it is adverse to actual applications of the tools and is not available for ready use of the industry.

Further, a torque wrench often needs to be held in a particular horizontal angle in the operation thereof. If the wrench or the wrench socket is not set at a desired proper horizontal angle, a bolt or a nut that is being tightened may be damaged by breaking the thread thereof. Heretofore, a skilled operator relies completely upon his or her experience to control the horizontal angle and effective management and alarm may be not realized.

Prior art techniques in this field are known. For example, Taiwan Patent No. 1300027 discloses a torque wrench having a driving head that is provided with a torque display device, and Taiwan Patent No. 1307305 discloses a digital alarm device for torque wrenches. Both patents illustrate conventional solutions that mount torque detection/displaying or alarming devices to torque wrenches. However, in such known solutions, mounting the torque detection and displaying device to the torque wrench is a difficult operation and this makes the manufacturing of the torque wrench very complicated. Further, both patents provide solutions of detection of torque that are only applicable to specific torque wrenches and are not suitable for all kinds of hand tools.

In addition, Taiwan Utility Model No. M377299 discloses an angle-measureable torque tool coupler, wherein a torque wrench having a conventional construction is provided with torque/horizontal angle detection, displaying, and alarming for the purposes of realizing detection of angle. However, such a device is only good for personal use in detecting, displaying and issuing alarms associated with torque and horizontal angle. It is not possible for a large workshop to provide centralized control and management in respect of the use of torque wrenches. Thus, economic advantages gained through collective and consistent control and management of the use of torque wrenches cannot be realized.

SUMMARY OF THE INVENTION

The conventional hand tools are not provided with a mechanism for detection and displaying of torque and angle applied thereby, so that they are often suffering the problems of damaging threaded fasteners due to improper torque or angle applied in assembling and/or disassembling operations. Although prior art references provide solutions to this problem, the known solutions are only applicable to specific applications for detection and displaying torques and angles applied by torque wrenches.

To overcome the problems and drawbacks of the conventional devices, the present invention provides a torque detection and displaying device, which comprises at least one connection body, at least one tool joint bar, at least one signal ring assembly, a toque detection device, an angle sensor, a plurality of signal pick-up elements, and a displaying and processing unit. The connection body has an end coupled to the tool joint bar, and the tool joint bar is connected to at least one tool bit. The connection body is encased in a tool casing. The signal ring assembly is coupled between the connection body and the tool joint bar. The toque detection device and the angle sensor are attached to the connection body. The toque detection device and the angle sensor detect a torque and angle applied by the tool bit in a clockwise or counterclockwise rotation operation, and generate a torque detection signal and an angle detection signal that are supplied through the signal ring assembly. The signal pick-up elements are set in contact with the signal ring assembly to pick up the torque detection signal and the angle detection signal during the rotation of the connection body. The displaying and processing unit is connected to the signal pick-up elements to receive the torque detection signal and the angle detection signal and display an actual torque and angle that the tool bit applies in an operation.

The effectiveness of the multifunctional torque tool detection device of the present invention is that the device is composed of modularized connection body, tool joint bar, toque detection device, angle sensor, and displaying and processing unit, which are capable of coupling to various hand tools, so that when the multifunctional torque tool detection device is coupled to a hand too, such as a screwdriver, a wrench socket or a spanner, the multifunctional torque tool detection device allows the tool to detect and display the torque and angle currently applied thereby without adding the manufacturing costs of the hand tools themselves. Further, a signal ring assembly and multiple signal pick-up elements are provided in such a way that relative rotation is allowed therebetween when the tool joint bar is put into operation and signal pick-up is realized without being affected by the switching of the rotation direction of the tool joint bar, so as to allow processing and displaying actual torque and angle applied by the rotation operation of the tools. Thus, multiple mode detection and displaying of tool torque and angle can be realized.

BRIEF DESCRIPTION OF THE DRAWINGS

The present invention will be apparent to those skilled in the art by reading the following description of preferred embodiments thereof, with reference to the attached drawings, wherein.

DETAILED DESCRIPTION OF THE PREFERRED EMBODIMENTS

Figure 1:
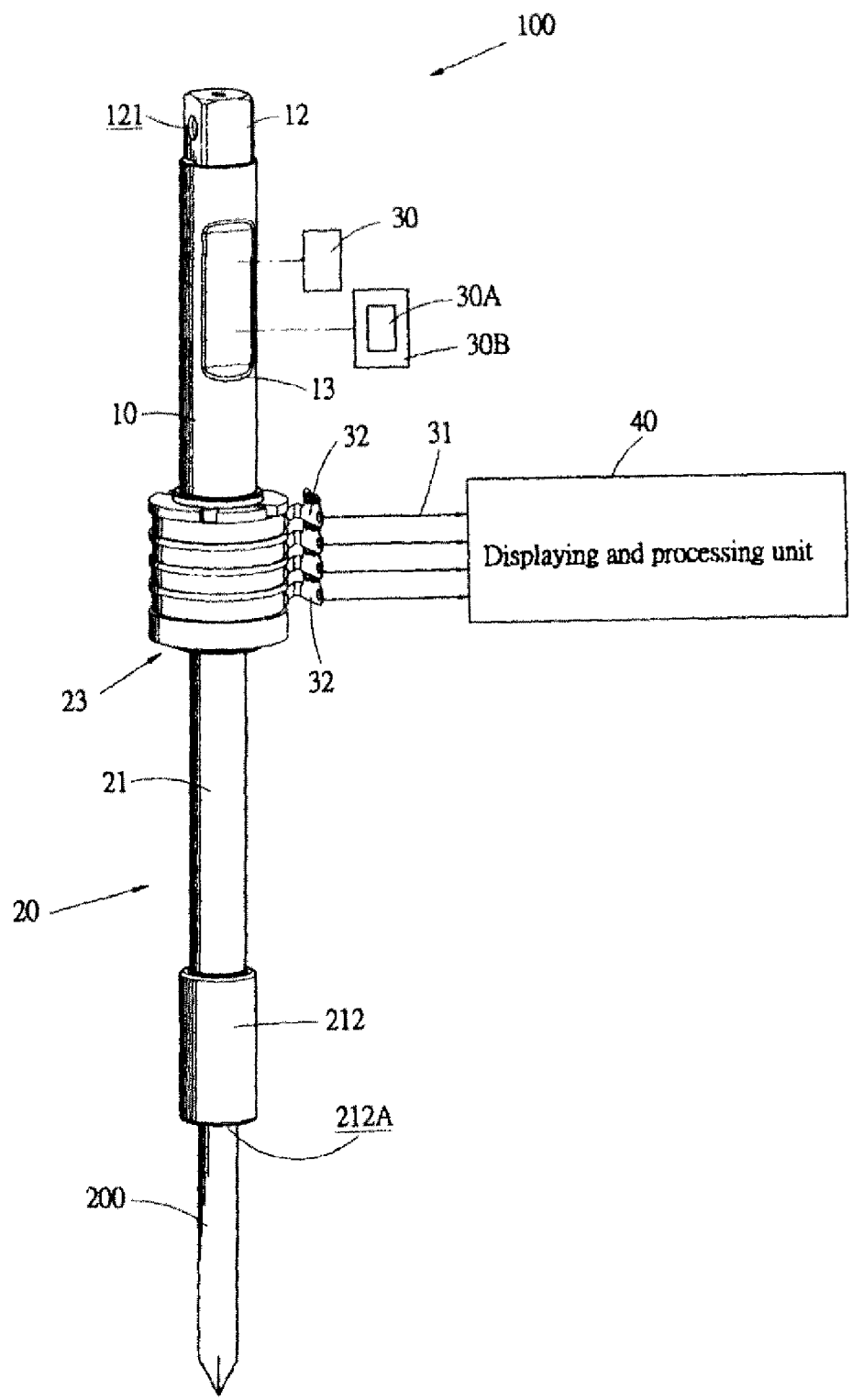
FIG. 1 is a perspective view showing a multifunctional torque tool detection device constructed in accordance with a first embodiment of the present invention.
Figure 2A:
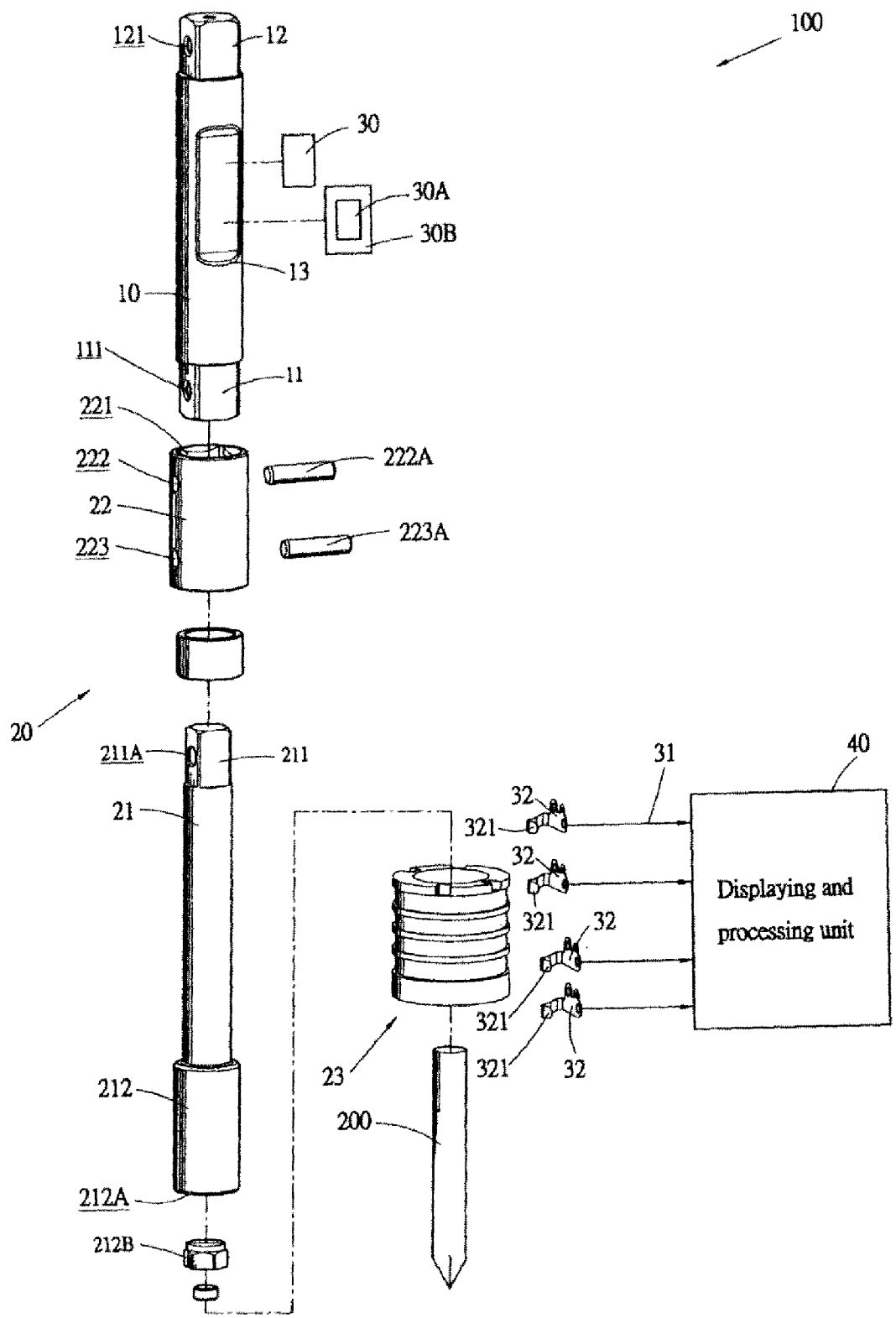
FIG. 2A shows an exploded view of the multifunctional torque tool detection device of FIG. 1.
Figure 2B:
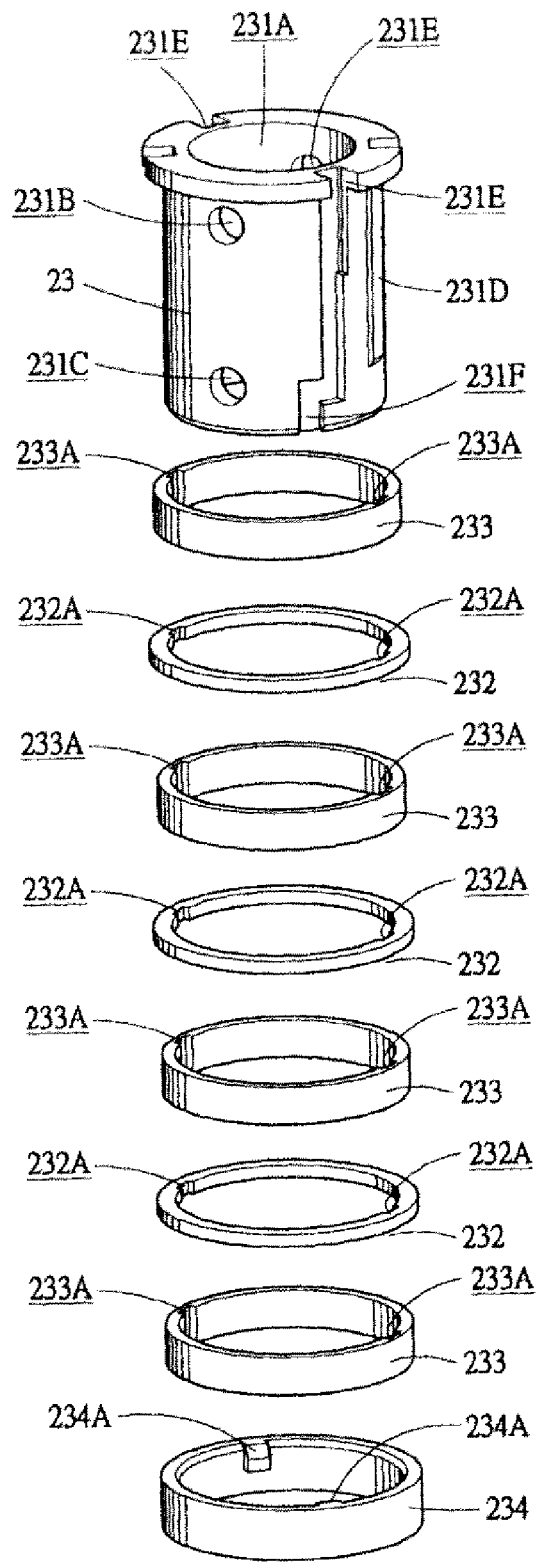
FIG. 2B shows an exploded view of a signal ring assembly of the multifunctional torque tool detection device of the present invention.
Figure 3:
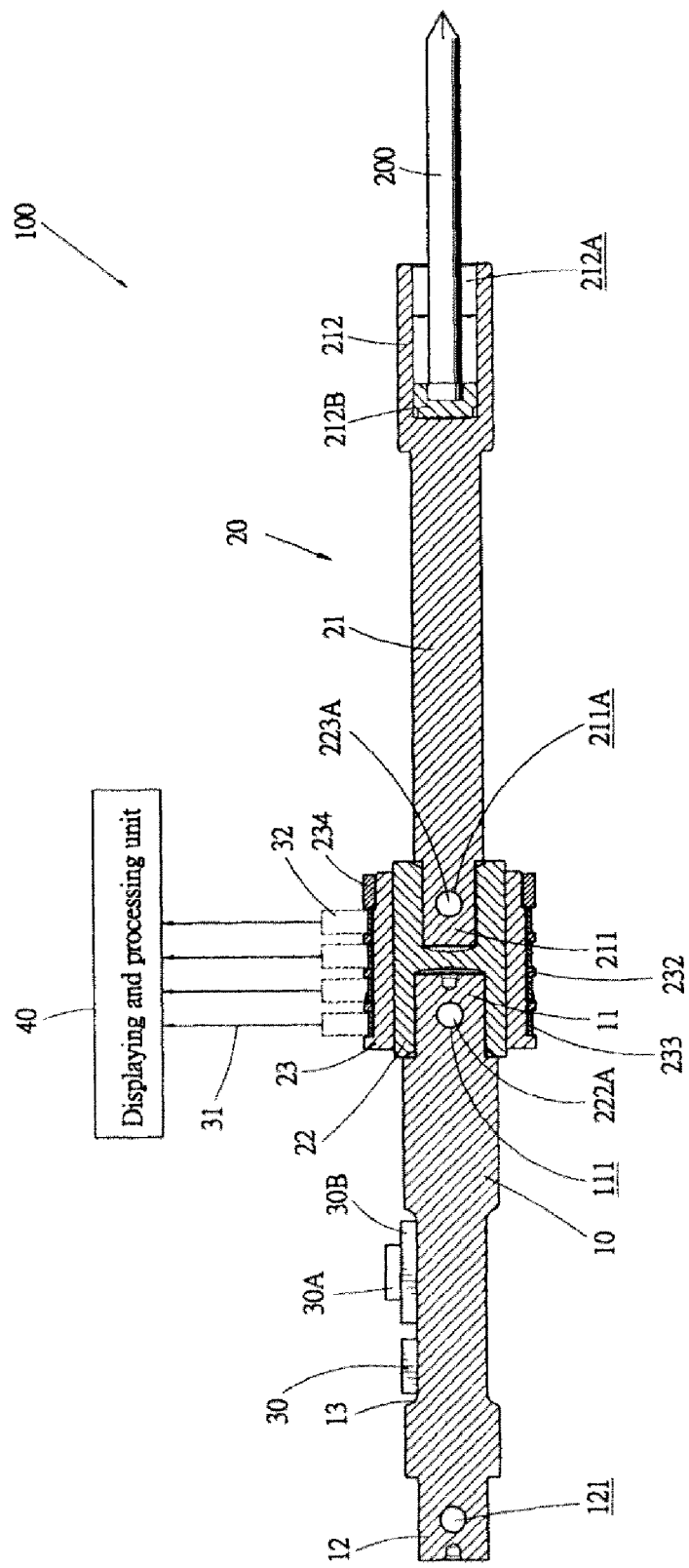
FIG. 3 shows a cross-sectional view of the multifunctional torque tool detection device of FIG. 1.

With reference to the drawings and in particular to FIGS. 1, 2A, 2B, and 3, which show a multifunctional torque tool detection device constructed in accordance with a first embodiment of the present invention, generally designated with reference numeral 100, the device 100 of the present invention comprises at least a connection body 10, which has two opposite ends respectively forming coupling ends 11, 12. The coupling ends 11, 12 each form a coupling hole 111, 121. The connection body 10 has an outer circumferential surface on which at least one retention section 13 is formed.

The device 100 further comprises at least one a tool joint bar 20, which is composed of a bar-like extender 21 and an adaptor 22. The extender 21 has two opposite ends, which respectively form a body connection section 211 and a tool connection section 212. The body connection section 211 forms at least one coupling hole 211A. The tool connection section 212 forms in an end face thereof a coupling bore 212A. The coupling bore 212A receives and retains therein at least one powerful magnet 212B for attracting and holding a tool bit 200, which has an end put into the coupling bore 212A, in the coupling bore 212A. The tool bit 200 is not limited to any specific type, and a screwdriver is taken as an example in the embodiment illustrated. However, other types of hand tool that offer rotation operation, such as wrench sockets and spanners, can be used in combination with the device of the present invention and is considered within the scope of the present invention.

The adaptor 22 forms therein at least one coupling bore 221 that axially extends through the adaptor 22 so as to form openings in opposite ends of the adaptor 22 for respectively receiving the coupling end 11 of the connection body 10 and the body connection section 211 formed at an end of the extender 21 to insert therein. The adaptor 22 has an outer circumferential wall through which retention holes 222, 223 are respectively defined at locations closed to the two ends of the adaptor 22. The retention hole 222 aligns with the coupling hole 111 of the coupling end 11 of the connection body 10, when the connection body 10 is inserted into the adaptor 22, and similarly, the retention hole 223 aligns with the coupling hole 211A of the body connection section 211 of the extender 21 when the extender 21 is inserted into the adaptor 22.

A signal ring assembly 23 comprises at least one sleeve 231, a plurality of insulation rings 232, a plurality of conductor rings 233, and at least one lock ring 234. The sleeve 231 defines a central through bore 231a, which is sized to fit over the outer circumferential wall of the adaptor 22. The sleeve 231 has an outer circumferential wall that defines through holes 231B, 231C, whereby the through hole 231B is set in alignment with the retention hole 222 of the adaptor 22 to receive a pin 222A extending through the through hole 231B, the retention hole 222, and the coupling hole 111 so as to releasably secure the coupling end 11 of the connection body 10, the adaptor 22 of the tool joint bar 20, and the sleeve 231 together, and the through hole 231C is set in alignment with the retention hole 223 of the adaptor 22 to receive a pin 223A extending through the through hole 231C, the retention hole 223, and the coupling hole 211A, so that the connection body 10 and the tool joint bar 20 are jointed to the sleeve 231 of the signal ring assembly 23.

The sleeve 231 also forms in the outer circumferential wall thereof at least two axially extending retention ribs 231D and at least two fixing grooves 231E. Each fixing groove 231E comprises a circumferentially-shifted lower opening 231F, which is shifted circumferentially with respect to the fixing groove 231E and is connected to the fixing groove 231E through a circumferentially extending passage (not labeled), whereby the opening 231F and the fixing groove 231E are in communication with the circumferential passage that is generally perpendicular to both the fixing groove 231E and the opening 231F.

Each insulation ring 232 is made of insulation material and has an inner circumference that defines at least two fitting notches 232A, which are respectively corresponding to and axially fit over the retention ribs 231D formed on the outer circumferential wall of the sleeve 231. Each conductor ring 233 is made of an electrically conductive material and has an inner circumference that defines at least two fitting notches 233A, which are respectively corresponding to and axially fit over the retention ribs 231D of the sleeve 231. The insulation rings 232 and the conductor rings 233 are fit to the sleeve 231 in such a way that the insulation rings 232 and the conductor rings 233 alternate each other in the axial direction of the sleeve 231, whereby the insulation rings 232 insulate and isolate the conductor rings 233 from each other.

The lock ring 234 has an inner circumference that forms at least two locking blocks 234A to be respectively fit into the openings 231F of the two fixing grooves 231E. Through rotation of the lock ring 234 in a given angular direction, such as counterclockwise, with respect to the sleeve 231, the locking blocks 234A are respectively and circumferentially moved along the circumferentially extending passages that connect the opening 231F to the respective fixing grooves 231E to reach the fixing grooves 231E so as to secure the lock ring 234 to the outer circumferential wall of the sleeve 231 due to the perpendicular connection of the passages between the fixing grooves 231E and the opening 231F.

The tool joint bar 20 is not limited to a combination of separate extender 21 and adaptor 22. If desired, the tool joint bar 20 can be formed of an integrated part combining the extender 21 and the adaptor 22, or any other structures providing equivalent functions, which are all considered within the scope of the present invention. Similarly, the connection between the connection body 10 and the tool joint bar 20 is not limited to the connection realized by the adaptor 22 and the pin 222A and can be done with any structure showing equivalent functions. And, the connection of the signal ring assembly 23 to the connection body 10 and the tool joint bar 20 is not limited to the connection realized through the adaptor 22 and the signal ring assembly 23 can be alternatively and integrally formed on the connection body 10 or the tool joint bar 20.

At least one toque detection device 30 is attached to the retention section 13 of the connection body 10. The toque detection device 30 is composed of a strain-deformation sensor or a semiconductor based sensor for detection of torque. In an embodiment of the present invention, the toque detection device 30 comprises a strain-deformation detective resistor, which is considered an illustrative example, and other devices, such as an integrated circuit device capable of detecting torque, are also considered within the scope of the present invention. The toque detection device 30 detects a torque induced by clockwise or counterclockwise operation of a tool bit 200, which is attached to the tool joint bar 20 coupled to the coupling end 11 of the connection body 10, and in response to the detection, generates a torque detection signal 31. The toque detection device 30 comprises one or more terminals coupled to at least one of the conductor rings 233 of the signal ring assembly 23, whereby the torque detection signal 31 can be transmitted through the conductor ring 233 for output.

At least one angle sensor 30A is provided. The angle sensor 30A is mounted to a circuit board 30B, which is in turn mounted to the retention section 13 of the connection body 10. The angle sensor 30A is not limited to any specific form and a gyro integrated circuit bearing a model number ISZ-650 of Invensense series available from Macnica Taiwan Limited is taken as an example herein. The angle sensor 30A functions to detect the value of a horizontal angle at which the connection body 10 and the tool joint bar 20 are set and to convert the detected angle value into an output of an angle value signal 31A. The angle sensor 30A has a terminal coupled to at least one of the conductor rings 233 of the signal ring assembly 23, whereby the angle value signal 31A can be transmitted through the conductor ring 233 for output.

A plurality of signal pick-up elements 32 made of conductors is provided, and each has a surface forming at least one contact tab 321. The contact tab 321 of each signal pick-up element 32 is set in contact with each conductor ring 233 of the signal ring assembly 23 to allow the signal pick-up elements 32 to respectively pick up the torque detection signal 31 and the angle value signal 31A.

At least one displaying and processing unit 40 is composed of one or more circuits capable of digitally displaying a torque value and an angle value and displaying of operation functions/menus. The displaying and processing unit 40 is electrically connected to the signal pick-up elements 32 to receive the torque detection signal 31 detected by the toque detection device 30 and the angle value signal 31A detected by the angle sensor 30A and to display the values of torque and angles that are applied in a rotation operation of the tool bit 200.

Figure 4:
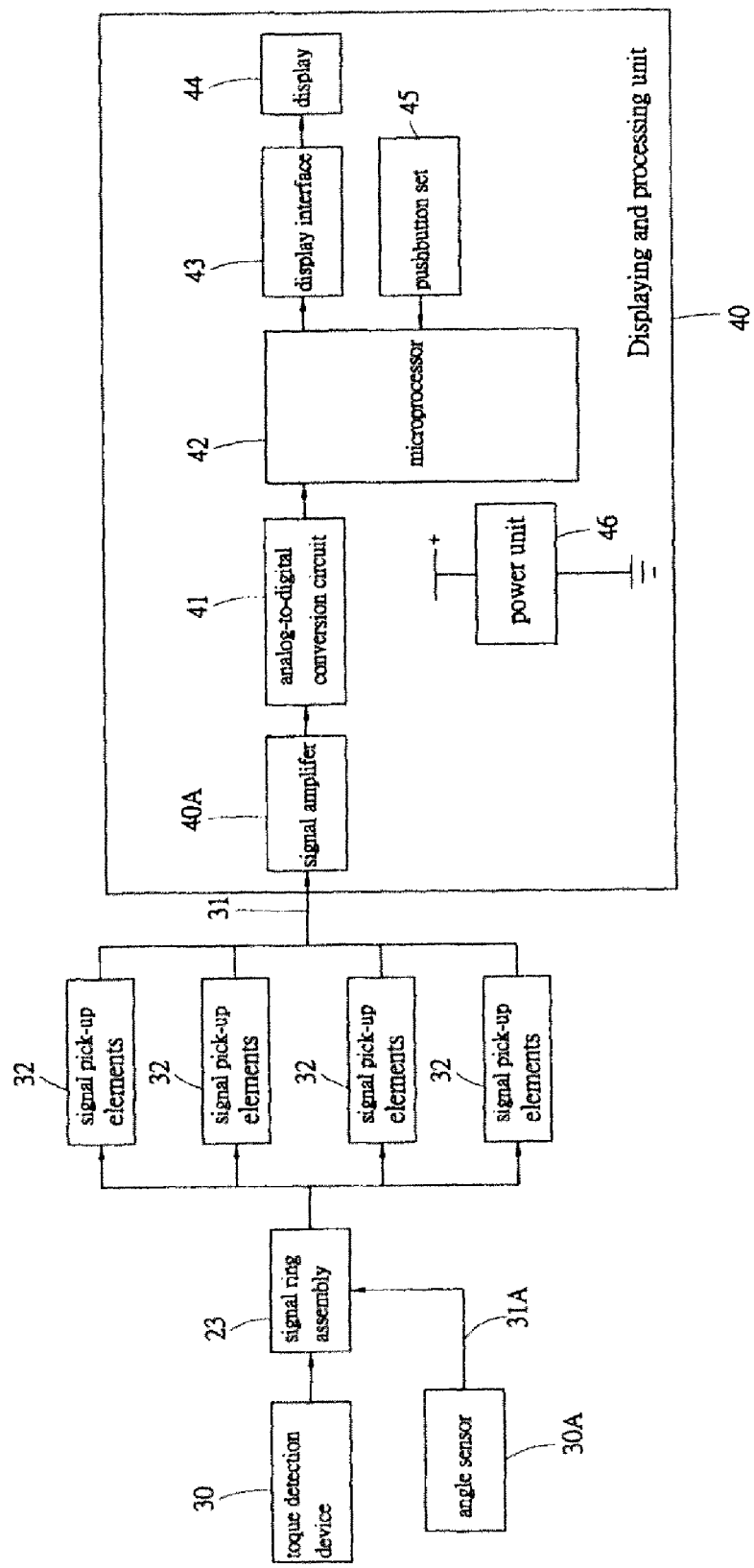
FIG. 4 shows a second embodiment of the multifunctional torque tool detection device in accordance with the present invention.

Referring to FIG. 4, a second embodiment of the device 100 in accordance with the present invention is shown. In the second embodiment of the device 100, the displaying and processing unit 40 comprises at least one signal amplifier 40A, an analog-to-digital conversion circuit 41, a microprocessor 42, a display interface 43, a display 44, a pushbutton set 45, and a power unit 46. The signal amplifier 40A is electrically connected to the signal pick-up elements 32 to receive and amplify the torque detection signal 31 and the angle value signal 31A. The analog-to-digital conversion circuit 41 is electrically connected to the signal amplifier 40A to convert the torque detection signal 31 and the angle value signal 31A that have been amplified by the signal amplifier 40A into digital torque value data and digital angle value data. The microprocessor 42 is electrically connected to the analog-to-digital conversion circuit 41 to receive the digital torque value data and the digital angle value data supplied from the analog-to-digital conversion circuit 41, and the microprocessor 42 provides the functions of temporal storage of the torque and angle value data and control and operation of displaying.

The display interface 43 is electrically connected to the microprocessor 42 to receive and convert the torque and angle value data into a torque value displaying signal and an angle value displaying signal. The display 44 is electrically connected to the display interface 43 to receive, process, and display the torque value displaying signal and the angle value displaying signal. The display 44 is not limited to any specific type, and in an embodiment, the display 44 comprises a liquid crystal display (LCD) device, which is considered an illustrative example of the present invention. Other displaying devices exhibiting equivalent functions, such as a light-emitting diode (LED) based displaying device, are considered within the scope of the present invention.

The pushbutton set 45, which is composed of one or more pushbuttons, is electrically connected to the microprocessor 42 to provide instructions associated with displaying operation to the microprocessor 42, such as switching of unit of the torque value displayed or a control command for controlling displaying brightness.

The power unit 46 provides a working power to the analog-to-digital conversion circuit 41, the microprocessor 42, the display interface 43, the display 44, and the pushbutton set 45. The power unit 46 is not limited to any specific type, and an example of a direct current battery or cell is used in an embodiment of the present invention. Other power supply devices, such as an alternate/direct current rectifier, are also considered within the scope of the present invention.

Figure 5:
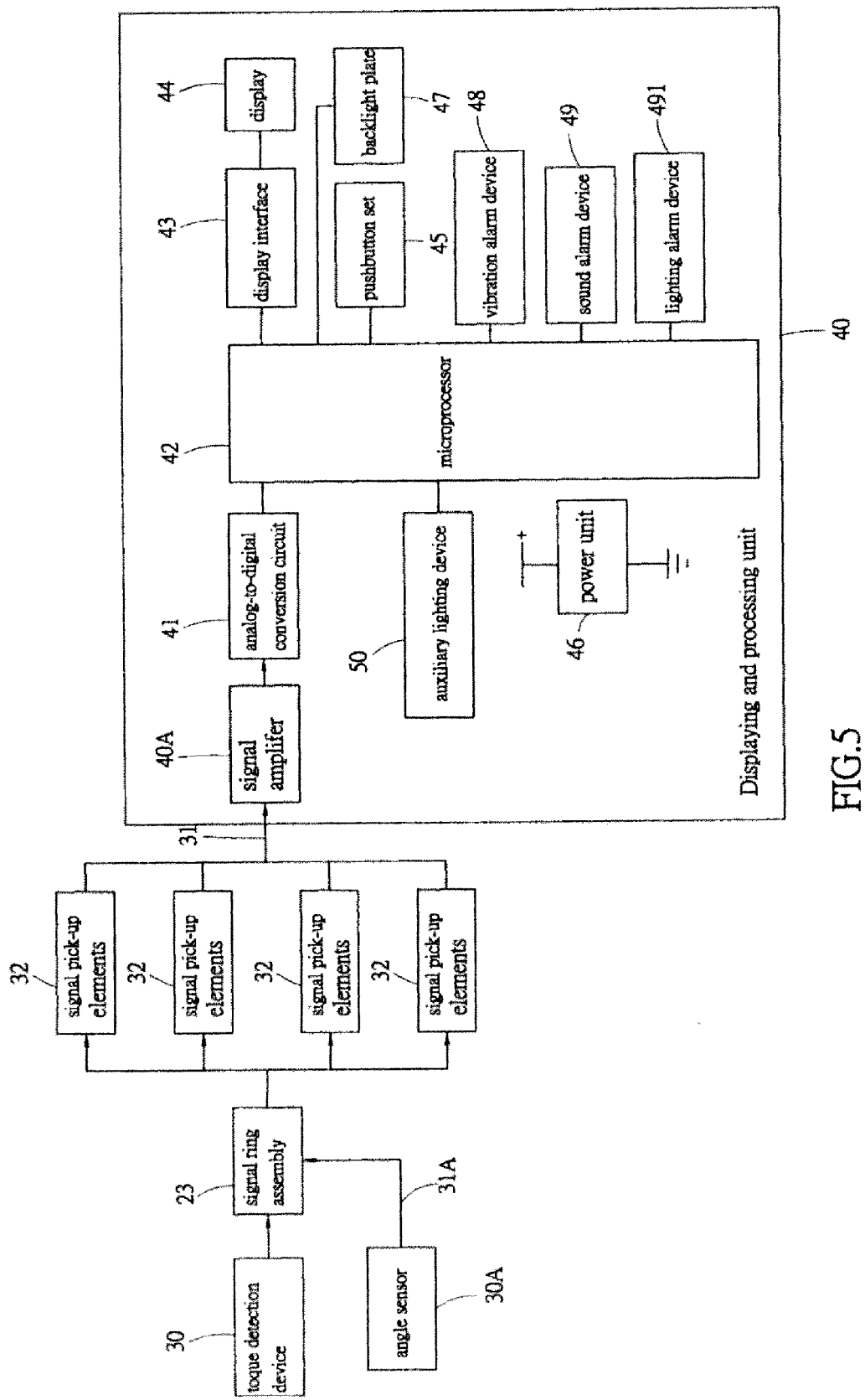
FIG. 5 shows a third embodiment of the multifunctional torque tool detection device in accordance with the present invention.

Referring to FIG. 5, a third embodiment of the device 100 in accordance with the present invention is shown. In the third embodiment, a backlight plate 47 and at least one vibration alarm device 48, a sound alarm device 49, a lighting alarm device 491, and an auxiliary lighting device 50 are further included in the displaying and processing unit 40 that is discussed with reference to FIG. 4. The backlight plate 47 is electrically connected to the microprocessor 42 to serve as a back light source for the display 44. The brightness of the backlight plate 47 can be controlled through the pushbutton set 45. The vibration alarm device 48, the sound alarm device 49, and the lighting alarm device 491 are respectively connected to the microprocessor 42, whereby when the microprocessor 42 receives a detection of the torque value and/or the angle value exceeding a preset threshold, the microprocessor 42 activates the vibration alarm device 48, the sound alarm device 49, and the lighting alarm device 491 to respectively issue vibration, sound alarms, and flashing light in order to notify an operator of the device 100 that the torque or angle applied by the tool bit 200 exceeds the preset threshold.

The preset thresholds of torque and angle can be set in the microprocessor 42 through operation of the pushbutton set 45.

The vibration alarm device 48, the sound alarm device 49, and the lighting alarm device 491 are not limited to any specific types or forms, and in an embodiment of the present invention, the vibration alarm device 48 comprises a vibration motor, the sound alarm device 49 comprises a buzzer as an illustrative example, and the lighting alarm device 491 can be composed of light-emitting diodes. Other types of electrical vibrating devices, sound generation devices, and light emitting devices exhibiting equivalent functions are all considered within the scope of the present invention.

The auxiliary lighting device 50 is electrically connected to the microprocessor 42 and the power unit 46. When an instruction is issued through the pushbutton set 45 to the microprocessor 42, the microprocessor 42 controls lighting ON/OFF states of the auxiliary lighting device 50, whereby the auxiliary lighting device 50 may illuminate the rotation operation of the tool bit 200. The auxiliary lighting device 50 is not limited to any specific form, and high brightness LED's are taken as example in the instant embodiment.

Figure 6:
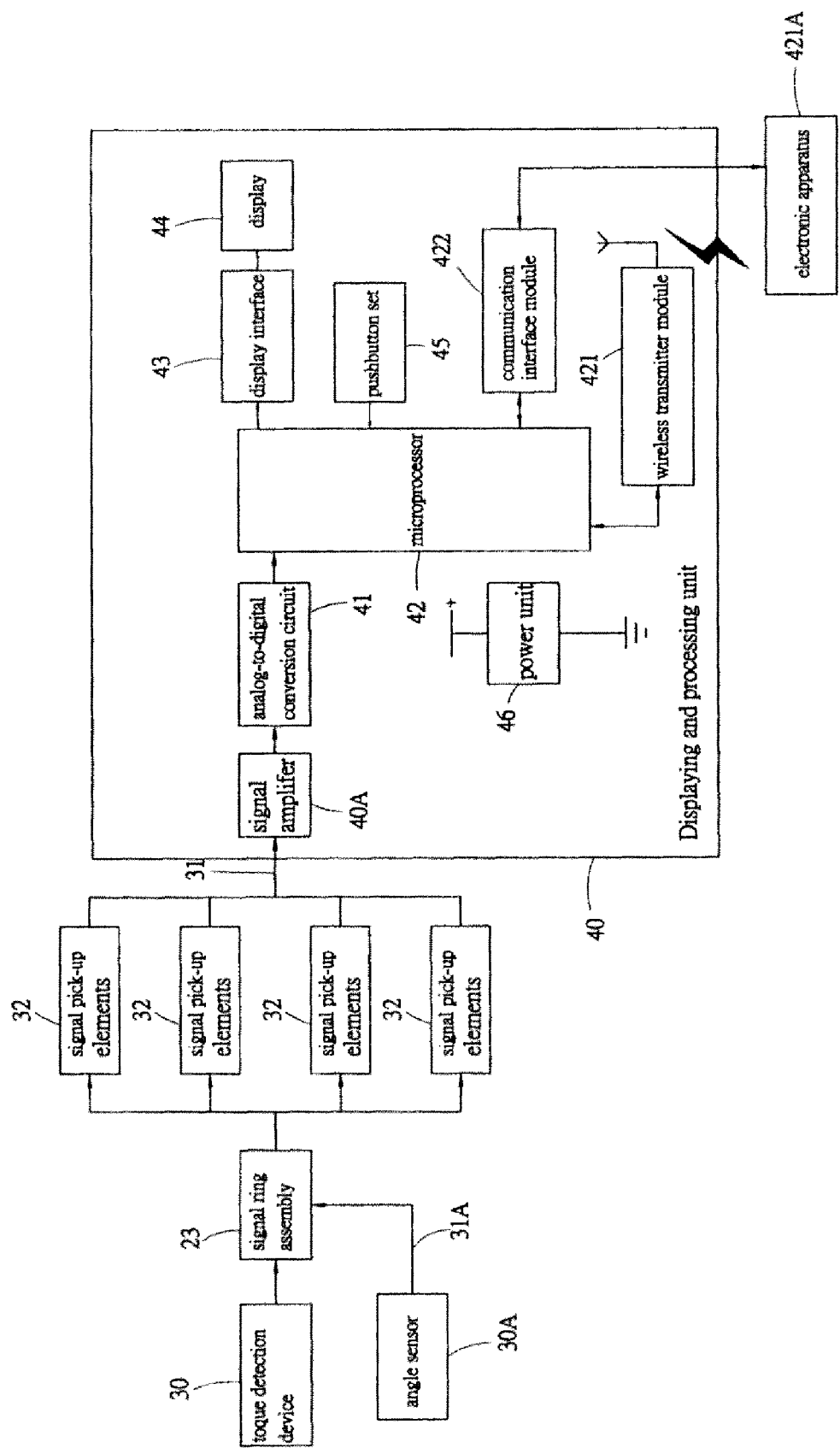
FIG. 6 shows a fourth embodiment of the multifunctional torque tool detection device in accordance with the present invention.
Figure 7:
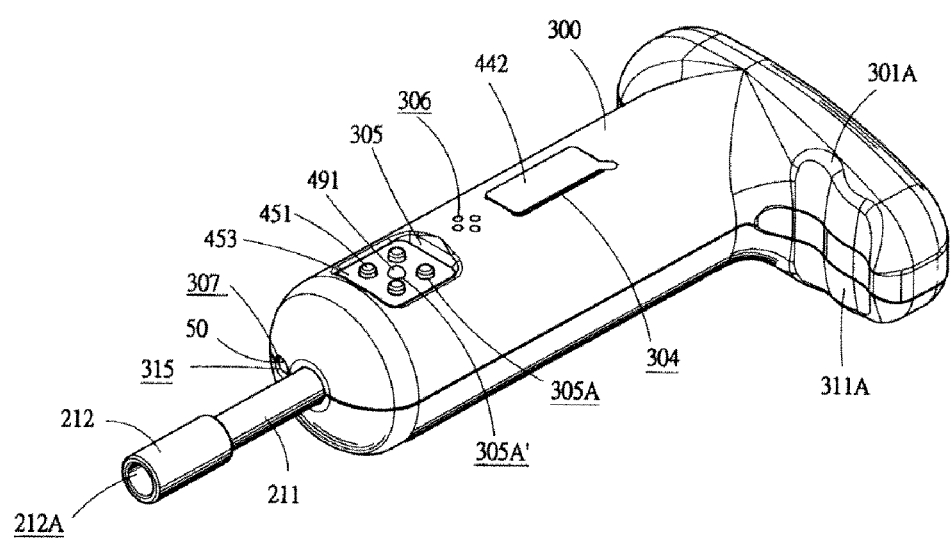
FIG. 7 shows a fifth embodiment of the multifunctional torque tool detection device in accordance with the present invention.
Figure 8:
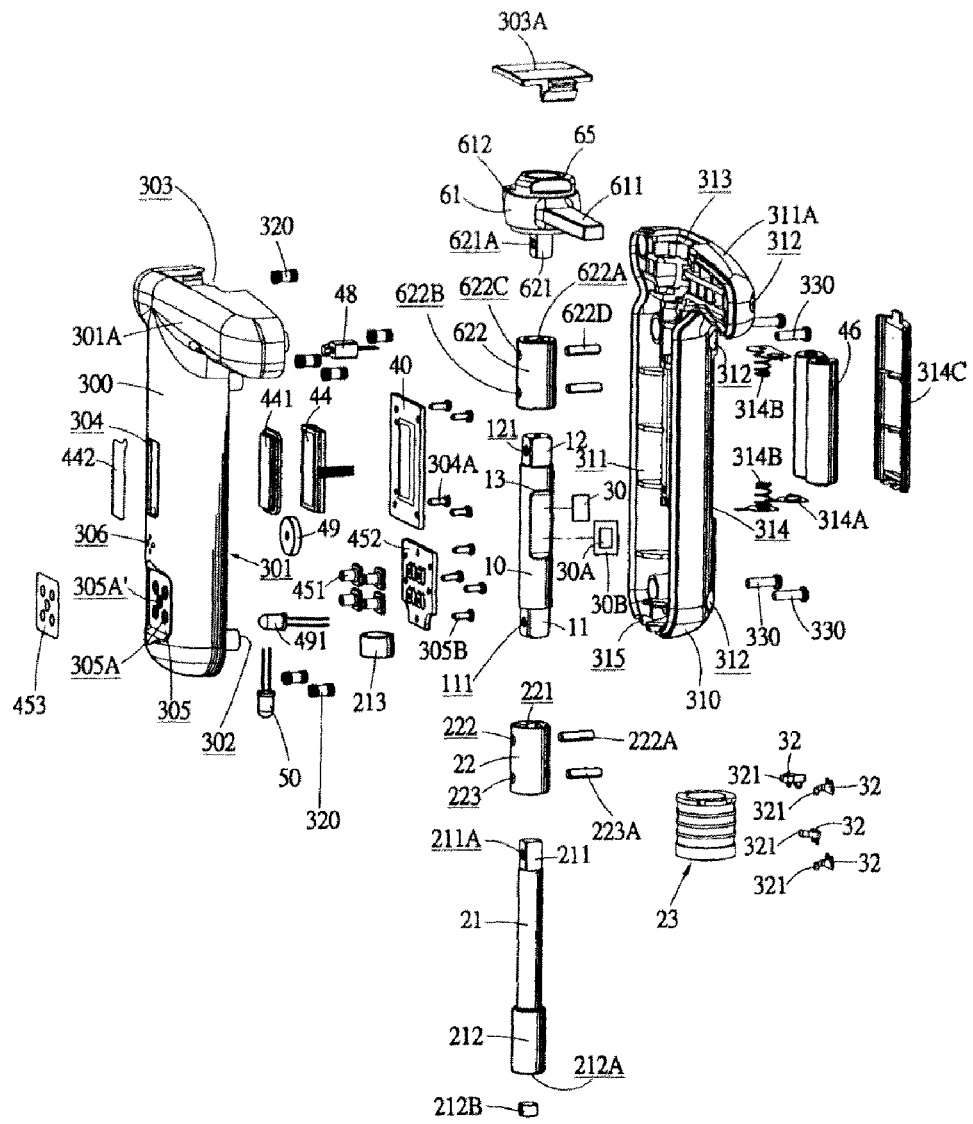
FIG. 8 shows an exploded view of FIG. 7.
Figure 9:
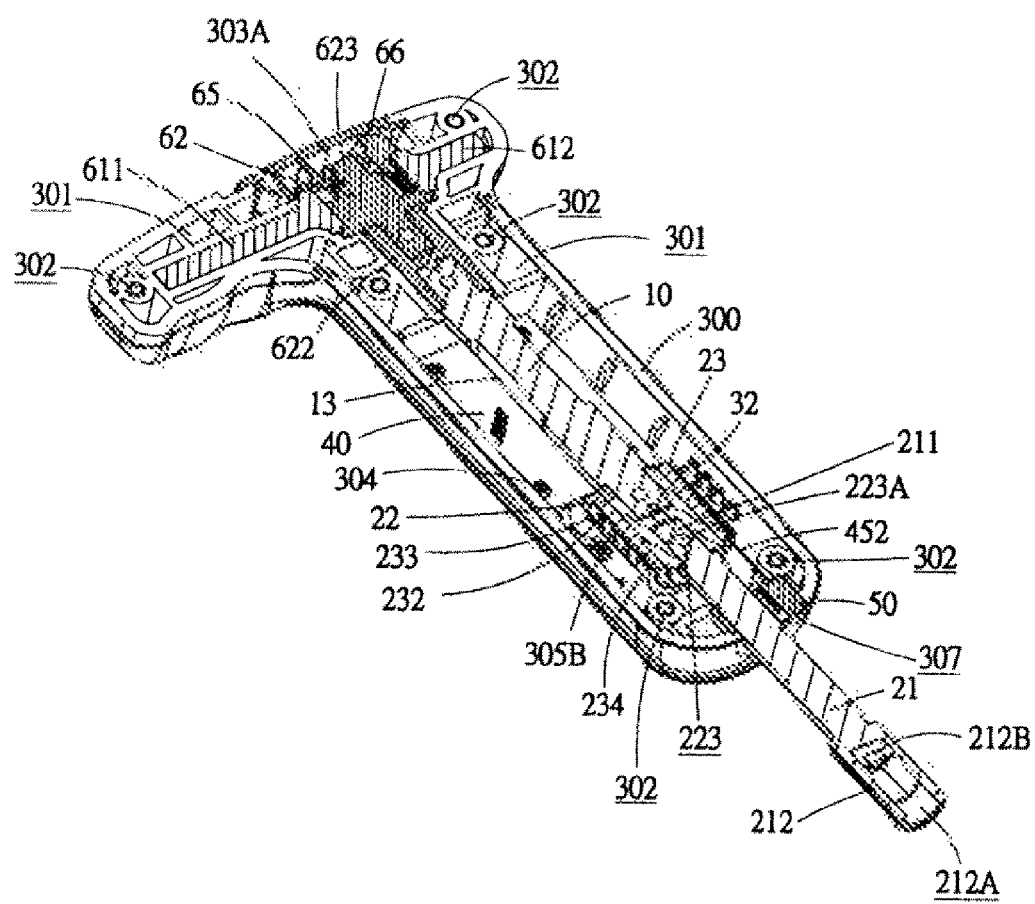
FIG. 9 shows a perspective view of the device of FIG. 7 in a cross-sectional form.
Figure 10:
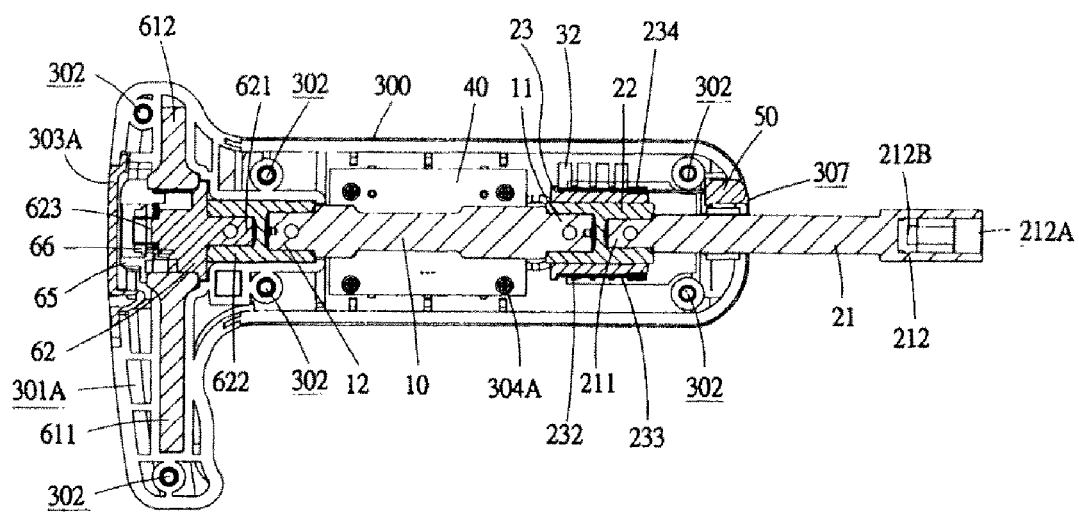
FIG. 10 shows a cross-sectional view of FIG. 7.

Referring to FIG. 6, a fourth embodiment of the device 100 in accordance with the present invention is shown. In the fourth embodiment of the device 100, the microprocessor 42 of the displaying and processing unit 40 further comprise a wireless transmitter module 421 and a communication interface module 422 for transmitting the torque value data and the angle value data, in a wireless or wired manner, to at least one electronic apparatus 421A. The wireless transmitter module 421 is not limited to any specific type and can be a wireless transmission mode of for example wireless USB (Universal Serial Bus), Blue Tooth, wireless local area network (WLAN), infrared (IR), amplitude shift keying (ASK) or frequency shift keying (FSK). The communication interface module 422 is not limited to any specific type, and can be for example USB interface, RS-422 interface, and IEEE1394 interface. Thus, the electronic apparatus 421A can be for example a mobile phone, a personal digital assistant (PDA), a notebook computer, or a personal computer (PC) that is equipped with wireless communication or wired connection interface means, in order to allow the torque value data and the angle value data to be transmitted, in a wireless or wired manner, to the electronic apparatus 421A for being used thereby or for further transmission by the electronic apparatus 421A for remote control and monitoring purposes.

Referring to FIGS. 7-11, a fifth embodiment of the device 100 in accordance with the present invention is illustrated, wherein the connection body 10, the tool joint bar 20, the toque detection device 30, and the displaying and processing unit 40 of the device 100 of the present invention are accommodated in an interior space defined between a pair of mated tool casing members 300, 310. The tool casing members 300, 310 form respective internal chambers 301, 311 that, when jointed together, form the interior space for accommodating the connection body 10, the tool joint bar 20, the signal ring assembly 23, the toque detection device 30, the signal pick-up elements 32, and the displaying and processing unit 40. The tool casing members 300, 310 are provided with mounting holes 302, 312 for receiving bolts 320, 330 for securing purposes therein. An end of the extender 21 of the tool joint bar 20 is fit in a collar 213 that serves as a bearing.

The tool casing members 300, 310 comprises mated rear handle portions 301A, 311A, which define therein at least a portion of the internal chambers 301, 311. A direction switching device 60 is received inside the handle portions 301A, 311A. The handle portions 301A, 311A respectively form access openings 303, 313 in communication with the internal chambers 301, 311 and is closed by a removable lid 303A.

Figure 11:
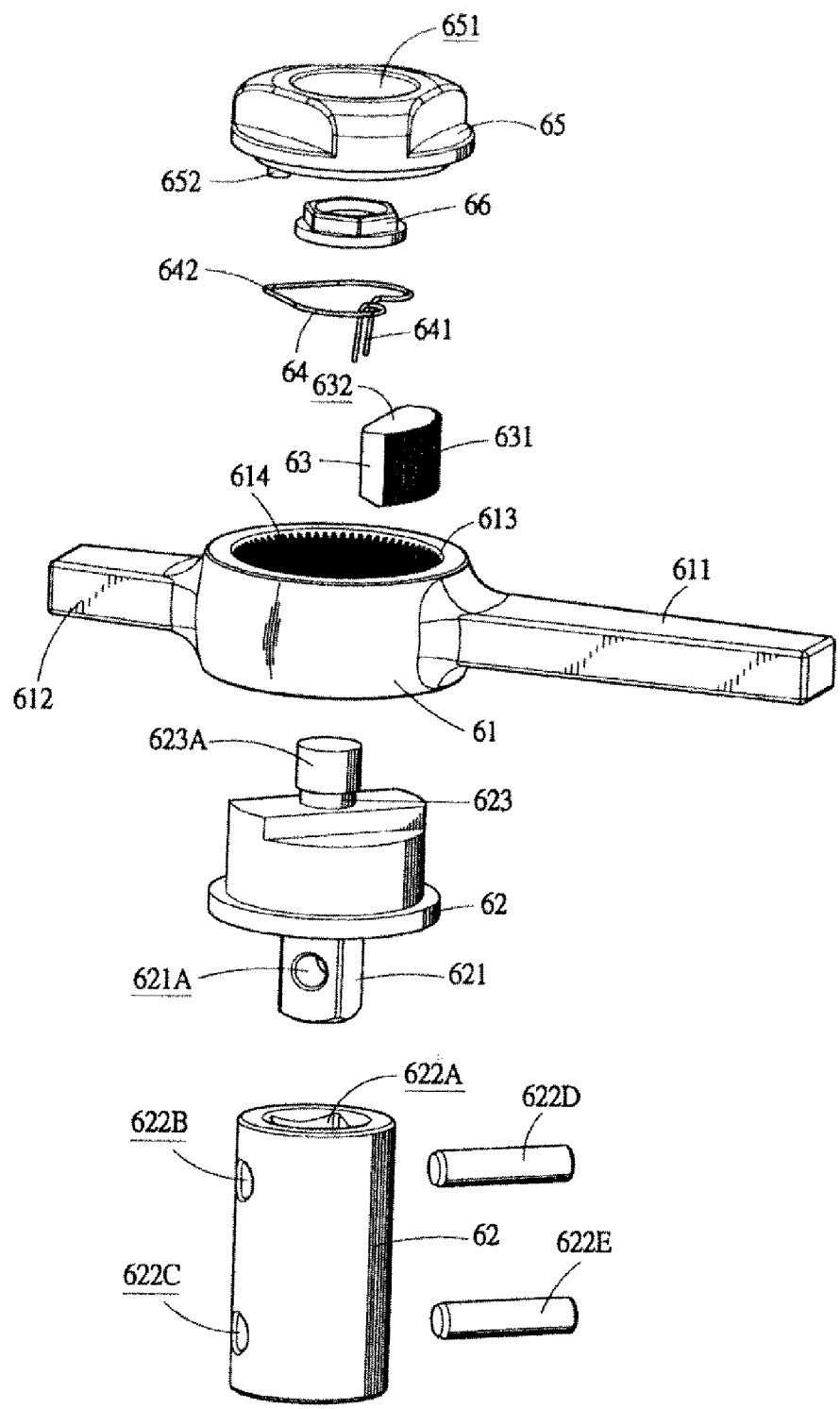
FIG. 11 shows an exploded view of a direction switching device of FIG. 8.

The direction switching device 60 is not limited to any specific type and, in the instant illustrative embodiment, the direction switching device 60 comprises a fixed frame 61, a coupler 62, a movable direction block 63, a heart-shaped spring 64, a switching knob 65, and a locking nut 66 (as shown in FIG. 11). The frame 61 forms at least two arms 611, 612 outward extending therefrom and the two arms 611, 612 are respectively received and fixed in the internal chambers 301, 311 of the handle portions 301A, 311A. The fixed frame 61 forms at least one bore 613 that has an inner circumferential surface forming a plurality of teeth 614.

The coupler 62 has a lower end forming a body connection portion 621, which forms at least one coupling hole 621A, and a connector 622, which defines therein a through bore 622A that has two opposite openings for respectively receiving the body connection portion 621 and the coupling end 12 of the connection body 10 to insert therein. The connector 622 has an outer circumferential wall through which retention holes 622B, 622C are respectively defined at locations closed to the two ends of the connector 622. The retention hole 622B aligns with the coupling hole 621A of the body connection portion 621 when the body connection portion 621 is inserted into the connector 622 so that a pin 622D is allowed to extend through the holes 622B, 621A to secure the coupler 62 to an end of the connector 622; and similarly, the retention hole 622C of the connector 622 aligns with the coupling hole 121 of the coupling end 12 of the connection body 10 when the coupling end 12 of the connection body 10 is inserted into the connector 622, so that a pin 622E is allowed to extend through both holes 622C, 121 to secure the coupler 62 to the connection body 10.

The coupler 62 has an upper end forming a connection shaft 623 that has an outer circumference forming an external thread 623A. The connection shaft 623 is set through the bore 613 of the frame 61.

The direction block 63 is received in the bore 613 of the frame 61 and has an outer surface forming teeth 631 in engagement with the teeth 614 of the bore 613. The direction block 63 forms at least one central hole 632.

The heart-shaped spring 64 is fit over the connection shaft 623 of the coupler 62. The spring 64 has an inner end and an outer end respectively forming a pair of insertion pins 641 and an apex 642. The insertion pins 641 are fit into the central hole 632 of the direction block 63 so as to form driving coupling between the direction block 63 and the spring 64.

The switching knob 65 forms a bore 651 in a central portion thereof. The bore 651 is fit over the connection shaft 623 of the coupler 62 and is secured to the coupler 62 by the locking nut 66 that engages the external thread 623A of the connection shaft 623, whereby the switching knob 65 is rotatable about the connection shaft 623. The switching knob 65 has a lower end forming at least one projection 652, which extends into inside the apex 642 of the spring 64 so that the projection 652 is coupled to the spring 64. When the switching knob 65 takes a clockwise or counterclockwise rotation, the spring 64 is driven by the projection 652 and in turn circumferentially shifts the direction block 63 in opposite directions. Thus, opposite ends of the direction block 63 are controlled by the clockwise or counterclockwise rotation of the switching knob 65 to take clockwise or counterclockwise circumferential shifting to selectively engage the teeth 614 of the bore 613 of the frame 61, serving as a ratcheting device. When the coupler 62 is driven to rotate by the tool bit 200, if the coupler 62 is brought into engagement with the direction block 63 in a forward direction, then the connection body 10, the tool joint bar 20, and the tool bit 200 are allowed to do forward and resilient torque rotation, and if the coupler 62 is brought into engagement with the direction block 63 in a backward direction, then the rotation of the tool bit 200 is stopped so that the tool bit 200 is set in a single direction ratchet-assisting resilient torque rotation. In other words, the connection body 10, the tool joint bar 20, and the tool bit 200 can be selectively set in a clockwise rotation or counterclockwise single-direction resilient torque rotation according to the switching operation of the switching knob 65 in clockwise direction or counterclockwise direction.

Through the switching operation of the switching knob 65, the direction switching device 60 can set the connection body 10, the tool joint bar 20, and the tool bit 200 in either clockwise or counterclockwise rotation, and the conductor rings 233 of the signal ring assembly 23 are kept in contact with the signal pick-up elements 32 so as to allow the toque detection device 30 to obtain the torque detection signal 31 through the signal pick-up elements 32.

The tool casing member 300 forms, in an outside surface thereof, a liquid crystal display window 304 and a pushbutton window 305. The liquid crystal display window 304 receives and fixes the displaying and processing unit 40 and the display 44 through bolts 304A. A transparent panel 441 and a protective film 442 are provided outside the display 44.

The pushbutton window 305 defines a plurality of pushbutton openings 305A and at least one display opening 305A'. The pushbutton set 45 of the displaying and processing unit 40 comprises a plurality of pushbuttons 451, a pushbutton circuit board 452, and a pushbutton panel 453. The pushbuttons 451 are mounted on the pushbutton circuit board 452. The pushbutton circuit board 452 is electrically connected to the microprocessor 42 of the displaying and processing unit 40. The pushbutton circuit board 452 is fixed inside the pushbutton window 305 through bolts 305B to allow the pushbuttons 451 to respectively project through the pushbutton openings 305A for user's access and operation. The pushbutton panel 453 is fit over the pushbuttons 451 and is attached, preferably with adhesives, to an outside surface of the pushbutton window 305 to provide indication to the functions of the pushbuttons 451. The display opening 305A' shows alarm light of the lighting alarm device 491 to the outside.

The tool casing member 310 forms therein a power chamber 314 for receiving and retaining the power unit 46, which can be for example a direct current cell or battery. The power chamber 314 is provided therein with power terminal members 314A, 314B for respectively engaging positive and negative electrodes of the power unit 46. The power terminal members 314A, 314B are also electrically connected to the analog-to-digital conversion circuit 41, the microprocessor 42, the display interface 43, the display 44, the pushbutton set 45, the backlight plate 47, the vibration alarm device 48, the sound alarm device 49, and the auxiliary lighting device 50 to supply a working power thereto. A lid 314C is provided outside the power chamber 314 to cover and close the power chamber 314.

The tool casing members 300, 310 have front ends respectively forming lighting openings 307, 315, which mate each other to receive and hold the auxiliary lighting device 50 of the displaying and processing unit 40, whereby the auxiliary lighting device 50 may provide lighting to illuminate the rotation operation of the tool bit 200.

The vibration alarm device 48 is set in the internal chambers 301, 311 of the handle portions 301A, 311A of the tool casing members 300, 310 to allow the vibration alarm device 48 to generate and transmit vibration to the handle portions 301A, 311A, whereby a user holds the handle portions 301A, 311A may sense the vibration to identify whether the operation torque or angle of the tool bit 200 exceeds the preset thresholds or not.

The tool casing member 300 forms a plurality of sound holes 306 and the sound alarm device 49 is set inside the tool casing member 300 at a location close to the sound holes 306 in order to transmit sound alarms generated by the sound alarm device 49 to a user, whereby the user may identify whether the operation torque or angle of the tool bit 200 exceeds the preset thresholds or not by listening to the sound alarms.

Figure 12:
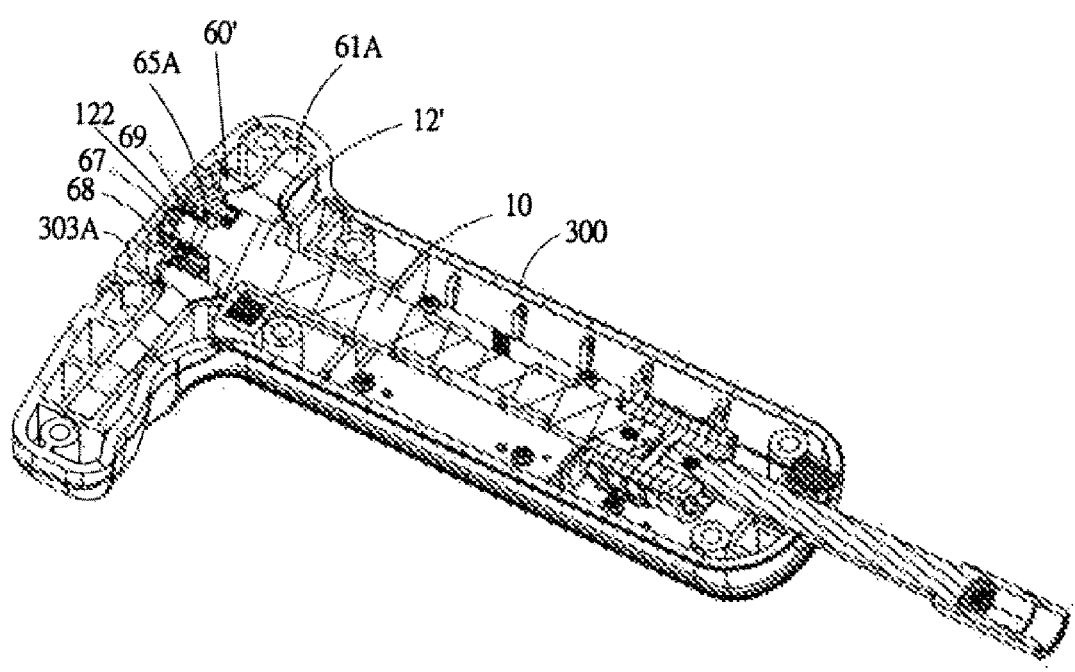
FIG. 12 shows a sixth embodiment of the multifunctional torque tool detection device in accordance with the present invention.
Figure 13:
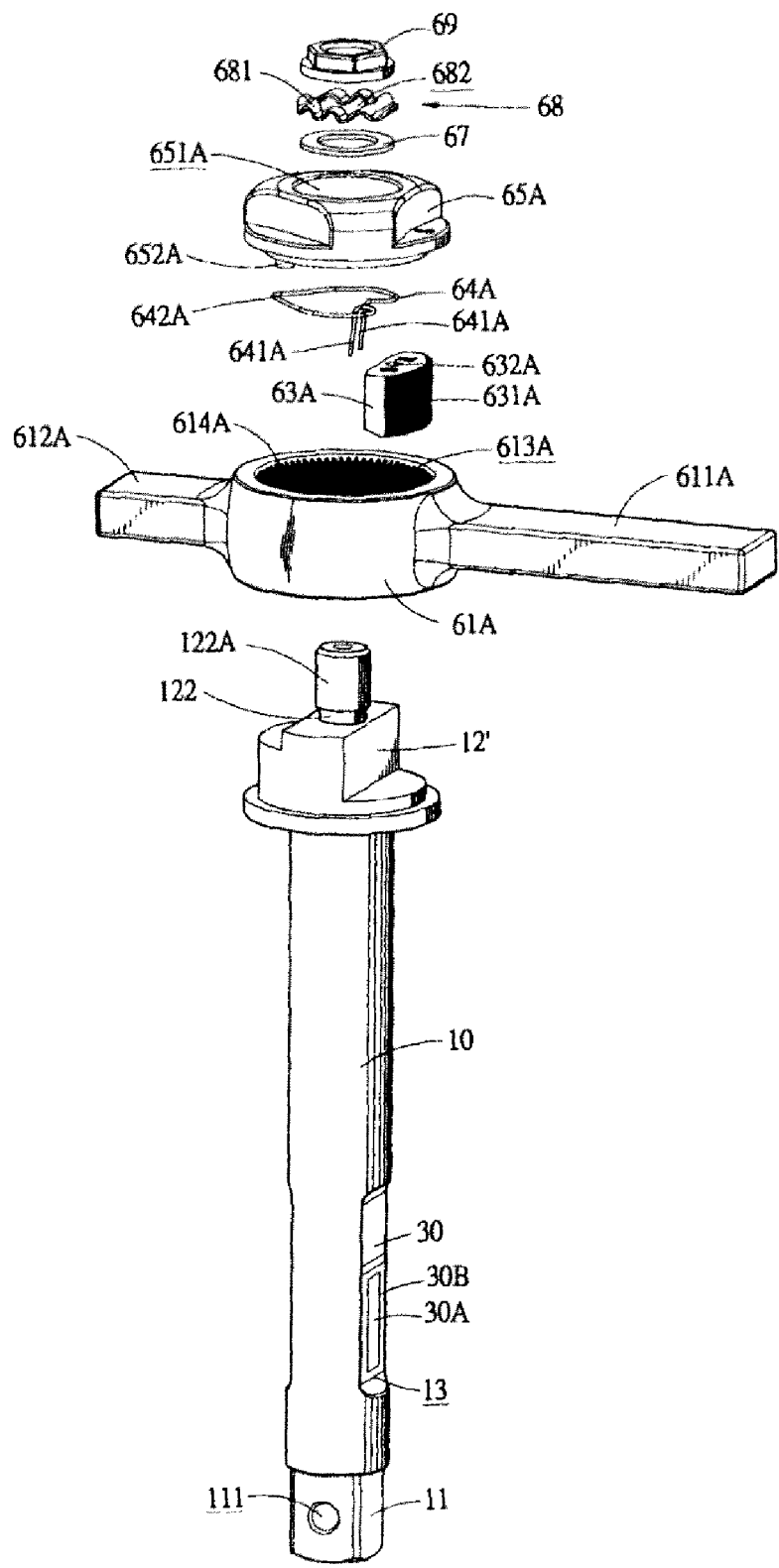
FIG. 13 shows an exploded view of a connection body and a direction switching device of FIG. 12.

Referring to FIGS. 12 and 13, a sixth embodiment of the device 100 in accordance with the present invention is shown, in which an alternative form for the direction switching device 60 shown in FIGS. 7-11 is provided, wherein the connection body 10 comprises a coupling end 12', which is made in the form similar to the coupler 62 of the direction switching device 60 shown in FIG. 11. The coupling end 12' has an upper end forming a connection shaft 122 that has an outer circumference forming an external thread 122A.

The direction switching device 60' comprises a fixed frame 61A, a movable direction block 63A, a heart-shaped spring 64A, a switching knob 65A, a washer 67, a securing spring plate 68, and a locking nut 69. The frame 61A forms at least two arms 611A, 612A outward extending therefrom to be respectively received and fixed in the internal chambers 301, 311 of the handle portions 301A, 311A. The fixed frame 61A forms at least one bore 613A that has an inner circumferential surface forming a plurality of teeth 614A. The bore 613A is fit over an outer circumference of the coupling end 12'.

The direction block 63A is received in the bore 613A of the frame 61A and has an outer surface forming teeth 631A in engagement with the teeth 614A of the bore 613A. The direction block 63A forms at least one central hole 632A.

The heart-shaped spring 64A is fit over the connection shaft 122 of the coupling end 12' of the connection body 10. The spring 64 has an inner end and an outer end respectively forming a pair of insertion pins 641A and an apex 642A. The insertion pins 641A are fit into the central hole 632A of the direction block 63A so as to form driving coupling between the direction block 63A and the spring 64A.

The switching knob 65A forms a bore 651A in a central portion thereof. The bore 651A is fit over the connection shaft 122 of the coupling end 12'.

The washer 67 is fit over the connection shaft 122 of the coupling end 12' and is positioned on the switching knob 65A.

The securing spring plate 68 has a surface forming a plurality of deformed portions 681 and the securing spring plate 68 forms a bore 682 in a central portion thereof. The bore 682 is fit over the connection shaft 122 of the coupling end 12' and positioned on the washer 67. The deformed portions 681 of the securing spring plate 68 are not limited to any specific forms and corrugation is taken as an example of the deformed portions 681 in the instant embodiment to provide the securing spring plate 68 with deformability when being compressed and a restoration force after being released.

The locking nut 69 engages the external thread 122A of the connection shaft 122, whereby through the deformability and restoration force provided by the deformed portions 681 of the securing spring plate 68, the switching knob 65A is allowed to take stepwise rotation about the connection shaft 122A, realizing the direction switching operation of single direction ratchet-assisting resilient torque rotation similar to the direction switching device 60 shown in FIGS. 7-11, which allows for selection between clockwise and counterclockwise rotation of the connection body 10 for resilient torque rotation.

Although the present invention has been described with reference to the preferred embodiments thereof illustrated in FIGS. 1-13, it is apparent to those skilled in the art that a variety of modifications and changes may be made without departing from the scope of the present invention which is intended to be defined by the appended claims.

What is claimed is:

1. A multifunctional torque tool detection device, comprising:
   at least one connection body, which has two opposite ends each forming a coupling end and an outer circumference surface forming at least one retention section;
   at least one tool joint bar, which has an end coupled to one of the coupling ends of the connection body and an opposite end adapted to couple to at least one tool bit that performs rotation operation to a threaded fastener;
   at least one signal ring assembly, which is coupled between the connection body and the tool joint bar and comprises a plurality of insulation rings and a plurality of conductor rings that alternate each other so as to allow the insulation rings to insulate and isolate the conductor rings from each other;
   at least one toque detection device, which is attached to the retention section of the connection body to detect a torque value induced by the rotation operation performed by the tool bit at an end of the tool joint bar and converts the torque value into a torque detection signal, the toque detection device being electrically coupled to at least one of the conductor rings of the signal ring assembly to supply the torque detection signal through the conductor ring;
   at least one angle sensor, which is attached to the retention section of the connection body to detect an angle value at which the tool bit at the end of the tool joint bar is set and converts the angle value into an angle detection signal, the angle sensor being electrically coupled to at least one of the conductor rings of the signal ring assembly to supply the angle detection signal through the conductor ring;
   a plurality of signal pick-up elements, which is respectively set in contact with the conductor rings of the signal ring assembly to pick up the torque detection signal and the angle detection signal; and
   at least one displaying and processing unit, which comprises a circuit for digitally displaying the torque value and the angle value and displaying of operation functions, the displaying and processing unit being electrically connected to the signal pick-up elements to receive the torque detection signal supplied from the toque detection device and the angle detection signal supplied from the angle sensor so as to display the torque value and the angle value that are induced by the rotation operation of the tool bit at an end of the tool joint bar.

2. The multifunctional torque tool detection device as claimed in claim 1, wherein one of the coupling ends of the connection body is coupled to a direction switching device.

3. The multifunctional torque tool detection device as claimed in claim 2, wherein the direction switching device comprising:
   a fixed frame, which forms at least one bore that has an inner circumferential surface forming a plurality of teeth;
   a coupler, which has a lower end forming a body connection portion, which is coupled to one of the coupling ends of the connection body so as to have the coupler secured to the connection body, the coupler having an upper end forming a connection shaft that is set through the bore of the fixed frame;
   a direction block, which is received in the bore of the fixed frame and has an outer surface forming teeth in engagement with the teeth of the bore, the direction block forming at least one central hole;
   a heart-shaped spring, which is fit over the connection shaft of the coupler and has inner and outer ends respectively forming insertion pins and an apex, the insertion pins being fit into the central hole of the direction block so as to form driving coupling between the direction block and the heart-shaped spring; and
   a switching knob, which forms a bore fit over the connection shaft formed at the upper end of the coupler and is secured to the coupler by a nut engaging external thread formed on the connection shaft, whereby the switching knob is rotatable about the connection shaft, the switching knob having a lower end forming at least one projection, which extends into the apex of the heart-shaped spring to have the projection coupled to the heart-shaped spring, so that rotation of the switching knob in opposite directions drives the heart-shaped spring to cause circumferential shifts of the direction block in opposite directions, and thus, the connection body is selectively set in single-direction resilient torque rotation according to the direction that the switching knob is being rotated.

4. The multifunctional torque tool detection device as claimed in claim 3, wherein a connector is provided to couple between the body connection portion of the coupler and one of the coupling ends of the connection body.

5. The multifunctional torque tool detection device as claimed in claim 2, wherein one of the coupling ends of the connection body comprises a configuration of a coupler, said one of the coupling ends having an upper end forming a connection shaft, the direction switching device comprising:
   a fixed frame, which forms at least one bore that has an inner circumferential surface forming a plurality of teeth, the bore being fit over an outer circumference of said one of the coupling ends;
   a direction block, which is received in the bore of the fixed frame and has an outer surface forming teeth in engagement with the teeth of the bore, the direction block forming at least one central hole;
   a heart-shaped spring, which is fit over the connection shaft of the connection body and has inner and outer ends respectively forming insertion pins and an apex, the insertion pins being fit into the central hole of the direction block so as to form driving coupling between the direction block and the heart-shaped spring;
   a switching knob, which forms a bore in a central portion thereof and fit over the connection shaft formed on said one of the coupling ends of the connection body;
   a washer, which is fit over the connection shaft formed on said one of the coupling ends of the connection body and is positioned on the switching knob;
   a securing spring plate, which forms a bore in a central portion thereof and fit over the connection shaft formed on said one of the coupling ends of the connection body and positioned on the washer; and
   a locking nut, which is threadingly tightened to the connection shaft.

6. The multifunctional torque tool detection device as claimed in claim 5, wherein the securing spring plate has a surface forming a plurality of deformed portions.

7. The multifunctional torque tool detection device as claimed in claim 6, wherein the deformed portions comprise corrugation.

8. The multifunctional torque tool detection device as claimed in claim 1, wherein the connection body forms a coupling hole in each of the opposite ends thereof.

9. The multifunctional torque tool detection device as claimed in claim 1, wherein the tool joint bar comprising:
- an extender, which has two opposite ends respectively forming a body connection section and a tool connection section, the tool connection section forming a coupling bore for receiving an end of the tool bit to insert therein; and
- an adaptor, which forms at least one coupling bore that forms openings in opposite ends of the adaptor for respectively receiving one of the coupling ends of the connection body and the body connection section formed at an end of the extender to insert therein.

10. The multifunctional torque tool detection device as claimed in claim 9, wherein the coupling bore of the extender receives and retains therein at least one magnet.

11. The multifunctional torque tool detection device as claimed in 1, wherein the signal ring assembly comprises:
- a sleeve, which defines a central through bore having opposite openings respectively jointing an end of the connection body and an end of the tool joint bar, the sleeve having an outer circumferential wall that defines at least two axially extending retention ribs and at least two axially extending fixing grooves, each of the fixing grooves comprising a circumferentially-shifted opening;
- the plurality of insulation rings, each of which is made of insulation material and has an inner circumference that defines at least two fitting notches corresponding to and axially fit over the retention ribs formed on the outer circumferential wall of the sleeve;
- the plurality of the conductor rings, each of which is made of an electrically conductive material and has an inner circumference that defines at least two fitting notches respectively corresponding to and axially fit over the retention ribs of the sleeve, the insulation rings and the conductor rings being fit to the sleeve in an alternate manner so that the conductor rings are isolated from each other by the insulation rings; and
- a lock ring, which has an inner circumference that forms at least two locking blocks to be respectively fit into the openings of the two fixing grooves formed in the outer circumferential wall of the sleeve, whereby through rotation of the lock ring with respect to the sleeve, the locking blocks are moved from the openings through circumferentially extending passages into and retained in the fixing grooves.

12. The multifunctional torque tool detection device as claimed in claim 1, wherein the toque detection device comprises a strain-deformation based torque sensor.

13. The multifunctional torque tool detection device as claimed in claim 1, wherein the toque detection device comprises a semiconductor based torque sensor.

14. The multifunctional torque tool detection device as claimed in claim 1, wherein the angle sensor comprises a gyro integrated circuit.

15. The multifunctional torque tool detection device as claimed in claim 1, wherein the signal pick-up elements are made of conductors.

16. The multifunctional torque tool detection device as claimed in claim 1, wherein each of the signal pick-up elements has a surface forming at least one contact tab, which is set in contact with each of the conductor rings of the signal ring assembly.

17. The multifunctional torque tool detection device as claimed in claim 1, wherein the displaying and processing unit comprises:
- at least one signal amplifier, which is electrically connected to the signal pick-up elements to receive and amplify the torque detection signal and the angle detection signal;
- at least one analog-to-digital conversion circuit, which is electrically connected to the signal amplifier to convert the torque detection signal and the angle detection signal that have been amplified by the signal amplifier into digital torque value data and digital angle value data;
- at least one microprocessor, which is electrically connected to the analog-to-digital conversion circuit to receive the torque value data and the angle value data supplied from the analog-to-digital conversion circuit, the microprocessor providing functions of temporal storage of the torque value data and the angle value data and control and operation of displaying;
- at least one display interface, which is electrically connected to the microprocessor to receive and convert the torque value data and the angle value data into a torque value displaying signal and angle value displaying signal;
- at least one display, which is electrically connected to the display interface to receive, process, and display the torque value displaying signal and the angle value displaying signal;
- at least one pushbutton set, which is electrically connected to the microprocessor to provide instructions associated with displaying operation to the microprocessor; and
- at least one power unit, which supplies working power to the analog-to-digital conversion circuit, the microprocessor, the display interface, the display, and the pushbutton set.

18. The multifunctional torque tool detection device as claimed in claim 17, wherein the display comprises a liquid crystal display.

19. The multifunctional torque tool detection device as claimed in claim 17, wherein the power unit comprises a direct current battery.

20. The multifunctional torque tool detection device as claimed in claim 17, wherein the power unit comprises an alternate/direct current rectifier.

21. The multifunctional torque tool detection device as claimed in claim 17, wherein the power unit comprises an alternate/direct current rectifier.

22. The multifunctional torque tool detection device as claimed in claim 17, wherein the microprocessor is electrically connected to a wireless transmitter module.

23. The multifunctional torque tool detection device as claimed in claim 17, wherein the microprocessor is electrically connected to a communication interface module.

24. The multifunctional torque tool detection device as claimed in claim 1, wherein the displaying and processing unit comprises:
- at least one signal amplifier, which is electrically connected to the signal pick-up elements to receive and amplify the torque detection signal and the angle detection signal;
- at least one analog-to-digital conversion circuit, which is electrically connected to the signal amplifier to convert the torque detection signal and the angle detection signal that have been amplified by the signal amplifier into digital torque value data and digital angle value data;

at least one microprocessor, which is electrically connected to the analog-to-digital conversion circuit to receive the digital torque value data and the digital angle value data supplied from the analog-to-digital conversion circuit, the microprocessor providing functions of temporal storage of the torque value data and the angle value data and control and operation of displaying, setting of reference thresholds of torque and angle, alarming on exceeding of the thresholds, and ON/OFF control of auxiliary lighting;

at least one display interface, which is electrically connected to the microprocessor to receive and convert the torque value data and the angle value data into a torque value displaying signal and an angle value displaying signal;

at least one display, which is electrically connected to the display interface to receive, process, and display the torque value displaying signal and the angle value displaying signal;

at least one pushbutton set, which is electrically connected to the microprocessor to provide instructions associated with displaying operation to the microprocessor;

at least one power unit, which supplies working power to the analog-to-digital conversion circuit, the microprocessor, the display interface, the display, and the pushbutton set;

a backlight plate, which is electrically connected to the microprocessor to serve as a back light source to the display;

at least one vibration alarm device, at least one sound alarm device, and at least one lighting alarm device, which are respectively connected to the microprocessor, whereby when the microprocessor receives a detection of the torque value and angle value exceeding the thresholds, the microprocessor activates the vibration alarm device, the sound alarm device, and the lighting alarm device individually to respectively issue vibration alarms, sound alarms, and light alarms; and at least auxiliary lighting device, which is electrically connected to the microprocessor and the power unit, whereby when an instruction is issued through the pushbutton set to the microprocessor, the microprocessor controls lighting ON/OFF states of the auxiliary lighting device.

25. The multifunctional torque tool detection device as claimed in claim 24, wherein the microprocessor is electrically connected to a wireless transmitter module.

26. The multifunctional torque tool detection device as claimed in claim 24, wherein the microprocessor is electrically connected to a communication interface module.

27. The multifunctional torque tool detection device as claimed in claim 24, wherein the display comprises a liquid crystal display.

28. The multifunctional torque tool detection device as claimed in claim 24, wherein the power unit comprises a direct current battery.

29. The multifunctional torque tool detection device as claimed in claim 24, wherein the power unit comprises an alternate/direct current rectifier.

30. The multifunctional torque tool detection device as claimed in claim 24, wherein the vibration alarm device comprises a vibration motor.

31. The multifunction torque tool detection device as claimed in claim 24, wherein the sound alarm device comprises a buzzer.

32. The multifunctional torque tool detection device as claimed in claim 24, wherein the lighting alarm device comprises a light-emitting diode.

33. The multifunctional torque tool detection device as claimed in claim 24, wherein the auxiliary lighting device comprises a high brightness light-emitting diode.

34. The multifunctional torque tool detection device as claimed in claim 1, wherein the connection body, the tool joint bar, the signal ring assembly, the toque detection device, the angle sensor, the signal pick-up elements, and the displaying and processing unit are encased and retained inside mated tool casing members.

* * * * *